United States Patent [19]

Leland et al.

[11] Patent Number: 4,661,993

[45] Date of Patent: Apr. 28, 1987

[54] TECHNIQUE FOR IMPROVING RADIO SYSTEM PERFORMANCE DURING FADING

[75] Inventors: Kenneth W. Leland, Howell; Nelson R. Sollenberger, West Keansburg, both of N.J.

[73] Assignees: AT&T Company; AT&T Bell Laboratories, both of Murray Hill, N.J.

[21] Appl. No.: 660,078

[22] Filed: Oct. 12, 1984

[51] Int. Cl.[4] .......................... H04B 1/14; H04B 1/18
[52] U.S. Cl. ................................ 455/103; 455/129; 455/276; 455/289; 333/1.1
[58] Field of Search ............... 455/52, 101, 121, 123, 455/129, 124, 103, 272, 276, 289; 375/40; 333/1.1

[56] References Cited

U.S. PATENT DOCUMENTS

| | | | |
|---|---|---|---|
| 3,289,113 | 11/1966 | Boutelant | 333/1.1 |
| 3,392,336 | 7/1968 | Schroeder | 325/474 |
| 3,422,378 | 1/1969 | La Rosa | 333/1.1 |
| 3,693,088 | 9/1972 | Rustako, Jr. et al. | 325/56 |
| 3,745,464 | 7/1973 | Lee | 325/62 |
| 3,922,685 | 11/1985 | Opas | 455/129 |
| 4,559,489 | 12/1985 | Vancanti et al. | 333/1.1 |

OTHER PUBLICATIONS

Adachi, "Transmitter Diversity for a Digital FM Paging System", IEEE Trans. on Vehicular Tech., Nov. 1979, pp. 333–337.

Hattori et al., "Theoretical Studies of a Simulcast Digital Radio Paging System Using a Carrier Frequency Offset Strategy", IEEE Trans. on Vehicular Tech., Feb. 1980, pp. 87–95.

Primary Examiner—Jin F. Ng
Assistant Examiner—M. Huseman
Attorney, Agent, or Firm—David R. Padnes

[57] ABSTRACT

A technique for reducing the average fade duration of signals in a radio system by simulating motion of a plurality of transmitting antennas is disclosed. This simulation is accomplished by slowly and continuously varying a characteristic of the modulated carrier signal supplied to the antennas. The altered characteristic can either be the power of the modulated carrier signal supplied to each of the antennas or the phase between modulated carrier signals coupled to the antennas. This technique can also be applied at a receiver to reduce the average fade duration of signals arriving thereat by simulating motion of a plurality of receiving antennas.

19 Claims, 3 Drawing Figures

TECHNIQUE FOR IMPROVING RADIO SYSTEM PERFORMANCE DURING FADING

TECHNICAL FIELD

The present invention pertains to radio systems and, more particularly, to a technique which shortens the average duration of a fade and thereby improves system performance.

BACKGROUND OF THE INVENTION

Fading occurs when radio signals propagate along direct and indirect paths to the receiver. This phenomenon is caused by a variety of atmospheric conditions, such as temperature, humidity, pressure gradients, and signal reflections off buildings or other structures. The resulting interaction of direct and indirect radio signal propagation is undesirable in communication systems as it produces amplitude and delay distortion in the received signal. At times, this distortion is severe enough to render the received signal unintelligible.

While the duration of a fade typically has a statistical distribution, in mobile radio systems, which comprise a fixed base station and mobile units, the fade duration is also affected by the speed of the mobile unit. When the mobile unit is stationary or moving slowly, the average fade duration is longer than when the mobile unit is moving more rapidly. These longer fade intervals, which can each last for several hundreds of milliseconds, are particularly troublesome as it is more difficult, if not impossible, for receiver curcuitry to regenerate the information transmitted after such long periods of distortion. In addition, in some communication systems an established channel between the base and mobile unit may be dropped once supervision is lost for a prescribed time interval. These problems have led to the development of a variety of fade compensating techniques.

In one technique applied to digital signals, error correction schemes are utilized to reconstruct the originally transmitted signal. The problem with this technique is that the error correction schemes required for long fade intervals become rather unwieldy and produce excessive signal delays.

In another technique known as switched space diversity, a number of antennas are used at the transmitter or receiver along with apparatus which selects the optimal antenna at a particular time. While this technique is appropriate for digital and analog telecommunications applications, the abrupt switching of the information signal from one antenna to another at the transmitter increases the signal bandwidth, produces spurious emissions, and requires a feedback control path from the receiver to the transmitter. Moreover, abrupt switching of the incoming information signal from one antenna to another at the receiver produces undesirable interference. Switched space diversity is also inappropriate for certain systems applications, e.g., mobile radio systems, because the required use of multiple antennas in a mobile unit is cumbersome and expensive.

In still another technique known as maximal ratio space diversity or selection space diversity, multiple receivers are utilized along with apparatus which weighs or selects the receiver output signals. The shortcoming of this scheme is that the cost of the necessary multiple receivers can exceed system objectives.

SUMMARY OF THE INVENTION

In accordance with the present invention, the average fade duration of received signals in a radio system is reduced by simulating movement of a fixed base station or transmitter which sends out a carrier signal modulated with an information signal. Advantageously, the apparatus which provides this simulation can be disposed at the transmitter or receiver in a communications channel. At a transmitter, the simulation is accomplished by using multiple transmitting antennas at fixed locations along with apparatus which continually and gradually varies a characteristic of the modulated carrier signal coupled to the antennas. In one of the disclosed embodiments, this apparatus comprises a variable reactive impedance which gradually and continuously varies the amplitude or power of the modulated carrier signal supplied to each antenna. In another disclosed embodiment, this apparatus comprises a phase shifter which gradually and continuously varies the phase between the modulated carrier signals supplied to the antennas. In analogous fashion, at a receiver, multiple receiving antennas can be employed along with apparatus which continuously varies the amplitude or power of the modulated carrier signals supplied from each antenna or which gradually and continuously varies the phase between the modulated carriers supplied from the antennas.

A feature of the present invention is that the disclosed technique does not substantially alter the bandwidth of the information system. A further feature of the present invention is that it can be easily and economically implemented in mobile or line-of-sight radio systems employing a variety of modulation schemes.

DETAILED DESCRIPTION

Figure 1:
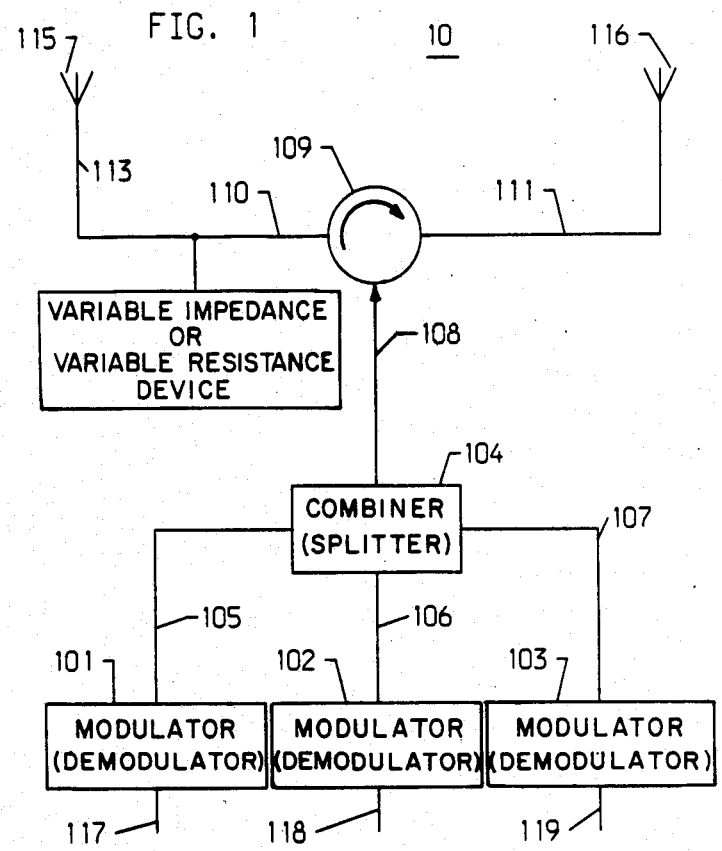
FIG. 1 is a block diagram of one embodiment of the present invention.

FIG. 1 depicts the transmitting portion of an exemplary base station 10 of a mobile radio system which incorporates an embodiment of the present invention. Modulators 101, 102 and 103 each frequency modulate a different carrier signal with the information signals supplied via leads 117, 118 and 119, respectively. Each carrier signal has a different frequency between 830 and 850 MHz. Combiner 104 receives the frequency modulated carrier signals and, in well-known fashion, couples these signals onto lead 108.

Base station 10, which has a fixed position, communicates with a number of conventional mobile units (not shown). Each mobile unit may also have the capability of transmitting an information signal back to a receiving position (not shown) of base station 10. This capability or the lack thereof does not affect the operation of the present invention.

To simulate movement of the base station and thereby reduce the average fade duration of signals arriving at a mobile unit, base station 10 incorporates two antennas 115 and 116, circulator 109 and variable impedance device 112. Antennas 115 and 116 each have a fixed position and are non-rotatable. Variable impedance device 112 provides a range of impedances and can be adjusted so that the impedance through transmission lines 110, 113 and device 112 is matched to the nominal impedance of circulator 109. If so, then circulator 109 couples all of the signal power or amplitude on lead 108 to transmission line 110 and thence to antenna 115. However, as the impedance of device 112 is varied, device 112 causes reflection of a portion of the signal power or signal amplitude on transmission line 110 back to circulator 109 and thence to transmission line 111 and antenna 116. The percentage of power reflected from transmission line 110 to transmission line 111 is directly related to the degree of impedance mismatch provided by device 112. While variable impedance device 112 could be resistive, the device ideally provides a purely reactive impedance so that no power is dissipated and, instead, is merely reflected. In addition, to minimize spreading of the transmitted signal spectrum, the impedance of device 112 is gradually and continuously varied. Preferably, the rate at which the impedance is varied is low relative to the information modulation rate, and the range of impedance provided by device 112 is selected to ensure that each of antennas 115 and 116 transmits a nonzero portion of the total power at any time. This slow and continuous variation makes the transmitted signal appear to be propagating from a fictitious antenna which is moving in a repetitive pattern between the positions of antennas 115 and 116. As a result, the time interval in which a stationary or slowly moving mobile unit remains in a fade-producing signal null is reduced. The repetitive pattern of the fictitious antenna is a function of the spatial relationship of the antennas, e.g., their separation and relative heights, the radiation pattern of each antenna and the range and variation rate of the reactive impedance device. In the illustrative system, the impedance of device 112 is varied at a rate of 30 to 60 Hz which is very much less than the information rate of a typical speech or data signal and the minimum power radiated from any antenna at any time is limited to 10% of the total transmitted power.

At this juncture, it should be understood that while the present invention has been described in relation to a particular mobile radio system, the present invention can be used in any line-of-sight or mobile radio system regardless of the type of carrier modulation employed. In addition, the use of three modulators and two antennas is similarly illustrative, as the present invention can be used with any number of modulators which are combined into one transmission line and with a plurality of antennas by simply adding additional circulators and reactive impedance devices to divide and vary the power in each antenna's transmission line.

Figure 2:
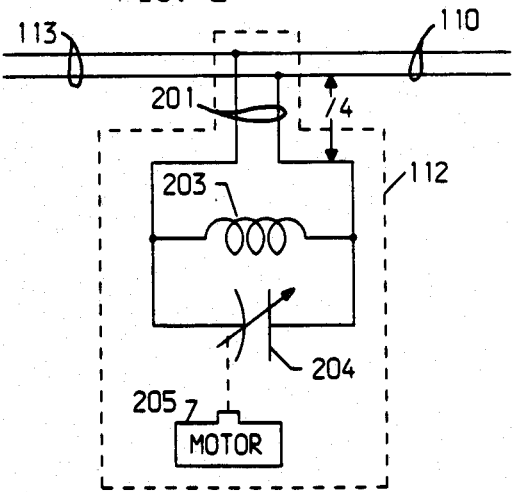
FIG. 2 is a detailed schematic of the reactive impedance device shown in FIG. 1.

Refer now to FIG. 2. Variable impedance device 112 comprises inductor 203 and variable capacitor 204 connected in parallel to form a tank circuit. Device 112 is connected to 50 ohm transmission lines 110 and 113 via ¼ wavelength (¼λ) 50 ohm transmission line 201. Inductor 203 has an impedance of approximately 10 ohms at the operating frequency band of the illustrative mobile communications system. Capacitor 204 is of the "butterfly-type" with an electrically-isolated shaft and rotating plates chosen to have an impedance between 10 and 40 ohms. To simulate movement of the base station, motor 205 rotates the shaft of capacitor 204 at a rate of 30 revolutions/second.

The tank circuit comprising inductor 203 and capacitor 204 goes through resonance twice with each revolution of motor 205 when the capacitance is 10 ohms. At this time, the tank circuit appears as an open circuit since the currents in the capacitor and inductor cancel. The ¼λ transmission line 201 transforms this open circuit impedance to substantially a short circuit impedance so that most of the signal power is reflected from transmission line 113 to transmission line 110 and thence through circulator 109 to antenna 116. However, when the capacitance provided by capacitor 204 is 40 ohms, 75% of the current in inductor 203 remains so as to provide a non-zero impedance of 13.3 ohms inductive. The ¼λ transmission line 201 changes this impedance to substantially 150 ohms capacitive, which simulates an open circuit which provides a good impedance match between transmission lines 110 and 113, so that most of the signal power is transmitted to transmission line 113 and antenna 115. The use of ¼λ transmission line 201 advantageously permits device 112 to be mounted remotely from transmission lines 110 and 113 as well as providing an impedance transformation.

Figure 3:
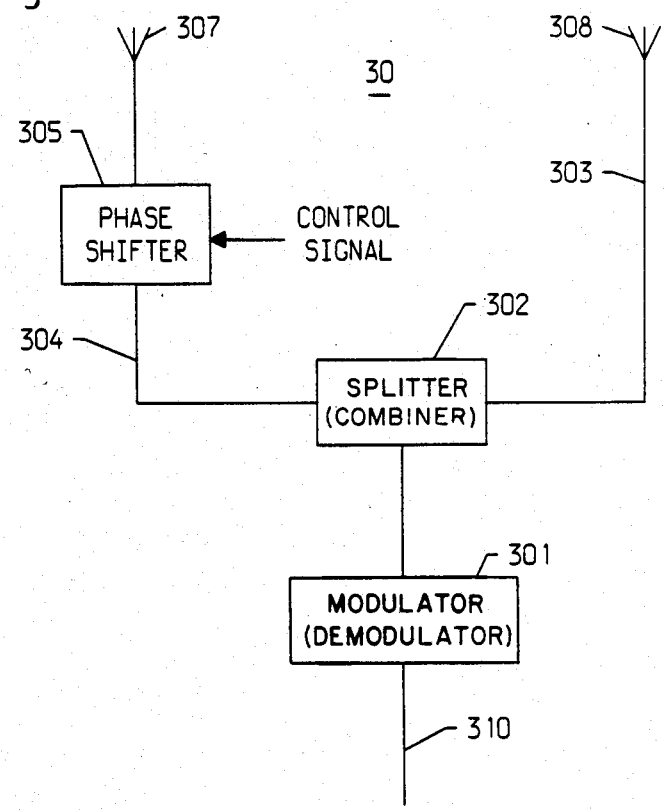
FIG. 3 is a block diagram of another embodiment of the present invention.

FIG. 3 shows the transmitting portion of a base station 30 within a mobile radio system incorporating another embodiment of the present invention. Again, it will be assumed that station 30 provides unidirectional or bidirectional communications from a fixed position to a number of mobile units (not shown). To provide outgoing communications capability, modulator 301 frequency modulates the information signal on lead 310 with a carrier signal having a frequency of several hundred megahertz. Splitter 302 couples the modulated carrier to transmission lines 303 and 304. Transmission line 303 is directly connected to fixed and non-rotatable antenna 308. Fixed and non-rotatable antenna 307, however, receives the modulated carrier signal on transmission line 304 after it passes through phase shifter 305. Shifter 305, in response to a 30–60 Hz control signal, gradually and continuously varies the phase of the carrier signal supplied to antenna 307 relative to the carrier signal supplied to antenna 308. This phase variation, as with the embodiment of FIG. 1, simulates movement of the base station by making the transmitted signals appear to be propagating from a fictitious antenna which is moving in a repetitive pattern between the fixed locations of antennas 307 and 308. This embodiment, as with that shown in FIG. 1, can be used with any number of modulators whose outputs are combined into a single line. Furthermore, any number of antennas can be used by adding signal splitters and phase shifters to divide and vary the phase between the signals supplied to the antennas.

While the foregoing discussion relates to the use of the present invention at a transmitter in a communications channel, the present invention can also be employed at the receiver of any communications channel. Accordingly, apparatus can be located at the mobile units of the exemplary mobile radio system to reduce the average fade duration of signals received thereat or at the receiver of the base station to reduce the average face duration of signals transmitted thereto from any mobile unit. Of course, the use of the present invention at the base station is, at times, more advantageous as it provides for the sharing of the necessary simulation apparatus between many communications channels. When used within a receiver, the radio signals would be arriving at the illustrated antennas of FIGS. 1 and 3, any combiner would be replaced by a signal splitter and vice versa, any modulator would be replaced by a demodulator and the ports of circulator 109 respectively connected to transmission lines 108 and 111 in FIG. 1 would be interchanged. These modifications of the present invention for use within a system receiver are shown in parentheses in FIGS. 1 and 3.

The above-described arrangements are, of course, merely illustrative of the application of the principles of the invention. Numerous other arrangements may be devised by those skilled in the art without departing from the spirit and scope of the invention. For example, the signal alterations provided by the present invention can be performed on a modulated carrier signal having a lower frequency which is the frequency translated to a higher frequency or "up-converted" prior to transmission. Similarly, the power of the modulated carrier signal which is altered by the present invention can be reduced and then appropriate amplification provided prior to transmission.

What is claimed is:

1. Radio system apparatus comprising
    a modulator for modulating a carrier signal with an information signal, and
    means for coupling said modulated carrier signal to a pair of antennas, each antenna having a fixed location, said coupling means smoothly and continuously altering the power of said modulated carrier signal coupled to each of said antennas but never varying the power coupled to either one of said antennas below a predetermined nonzero level, and the power alterations of said modulated carrier signal coupled to a first one of said antennas being opposite to the power alterations of said modulated carrier signal coupled to the other one of said antennas, whereby said alterations simulate motion of said antennas.

2. The apparatus of claim 1 wherein said coupling means smoothly and continuously alters the amplitude of said carrier signal coupled to said antennas.

3. The apparatus of claim 1 wherein said modulating means frequency modulates said carrier signal.

4. The apparatus of claim 1 wherein said altering means comprises a circulator.

5. The apparatus of claim 4 wherein said altering means further comprises a variable reactive impedance device whose impedance is continually varied to produce the power alterations.

6. The apparatus of claim 4 wherein said altering means further comprises a variable resistance device.

7. Radio system apparatus comprising
    a demodulator for extracting an information signal from a modulated carrier signal, and
    means for coupling said modulated carrier signal from a pair of antennas to said demodulator, each antenna having a fixed location, said coupling means smoothly and continuously altering the power of said modulated carrier signal coupled from each of said antennas but never varying the power coupled from either one of said antennas below a predetermined nonzero level, and the power alterations of said modulated carrier signal coupled from a first one of said antennas being opposite to the power alterations of said modulated carrier signal coupled from the other one of said antennas, whereby said alterations simulate motion of said antennas.

8. The apparatus of claim 7 wherein said coupling means smoothly and continuously alters the amplitude of said carrier signal coupled to said demodulator.

9. The apparatus of claim 7 wherein said demodulator frequency demodulates said carrier signal.

10. The apparatus of claim 7 wherein said altering means comprises a circulator.

11. The apparatus of claim 10 wherein said altering means further comprises a variable reactive impedance device whose impedance is continually varied to produce the power alterations.

12. The apparatus of claim 10 wherein said altering means further comprises a variable resistance device.

13. Radio system antenna coupling apparatus comprising
    signal transmission means,
    means for coupling at least one modulated carrier signal between said signal transmission means and a pair of antennas, and
    means, coupled to said coupling means, for smoothly and continuously altering the power of said at least one modulated carrier signal coupled between said transmission means and said antennas but never varying the power coupled between said transmission means and each of said antennas below a predetermined nonzero level, and the power alterations of said carrier signal coupled between said transmission means and one of said antennas being opposite to the power alterations of said modulated carrier signal coupled between said transmission means and the other one of said antennas, whereby said altering means simulate motion of said antennas.

14. The apparatus in accordance with claim 13 in which
    said coupling means comprises at least first and second transmission lines for signals of respective ones of said plurality of antennas, and
    said signal transmission means comprises
        a further transmission line for said at least one modulated carrier signal.

15. The apparatus in accordance with claim 14 in which said altering means comprises
    means, coupled to one of said first and second transmission lines, for varying the impedance of said one transmission line.

16. The apparatus of claim 13 wherein said altering means further comprises a variable reactive impedance device coupled to said coupling means.

17. The apparatus of claim 13 wherein said altering means further comprises a variable resistance device.

18. The apparatus of claim 13 wherein said altering means comprises a circulator.

19. A method of reducing the average fade duration in a radio system including a pair of antennas coupled for cooperation with signal transmission means, the method comprising the steps of
    coupling at least one modulated carrier signal between said signal transmission means and each of said antennas, and
    smoothly and continuously altering the power of said modulated carrier signal coupled between said transmission means and said antennas but never varying the power coupled between said transmission means and each of said antennas below a predetermined nonzero level, and the power alterations of said modulated carrier signal coupled between said transmission means and one of said antennas being opposite to the power alterations of said modulated carrier signal coupled between said transmission means and the other one of said antennas, whereby said altering simulates motion of said antennas.

* * * * *